: 2,977,363
Patented Mar. 28, 1961

2,977,363
SYNTHESIS OF 1,4-DIAZABICYCLO (2.2.2) OCTANE

Adalbert Farkas and Jack H. Krause, Media, Pa., assignors to Houdry Process Corporation, Wilmington, Del., a corporation of Delaware No Drawing. Filed July 30, 1958, Ser. No. 751,854

5 Claims. (Cl. 260—268)

This application is concerned with the preparation of 1,4-diazabicyclo-(2.2.2)-octane, referred to hereinafter as triethylene diamine, in high recoverable yields from reaction effluent mixtures as a product of high purity.

Triethylene diamine has been known, as shown in the literature, as a reaction product in small yield of N-2-bromo-ethyl-piperazine hydrobromide. The starting material in this instance is more of a laboratory curiosity than a commercially available chemical, and the production of triethylene diamine by this route has not provided any practical or commercially suitable process. While the preparation of cyclic diamines of this type had been attempted by organic chemists using many different methods, no suitable system for large-scale production of this compound, triethylene diamine, was available. Only low yields by expensive and involved procedures had been available until the system disclosed in co-pending application Serial No. 628,723 filed December 17, 1956, now Patent No. 2,937,176, was developed. In application, Serial No. 628,723, triethylene diamine is prepared by the vapor phase reaction of an aliphatic amine over acidic solid catalyst in a temperature range of 300–500° C. with the concomitant formation of appreciable quantities of piperazine. The reaction product is separated by fractionation into various cuts including one predominating in the triethylene diamine, from which cut purified material in respectable yields can be recovered.

Some of the other methods reported for the preparation of triethylene diamine have suggested the use of alkyl, alkylol, or other substituted amines as starting materials. Other work reported in Berichte has shown the preparation from diethanolamine hydrochloride by heating in the 200–260° C. range with the best results obtained by heating for 18 hours at 220° C., under which circumstances approximately 2% triethylene diamine was obtained. Other syntheses included the use of starting materials such as triethanolamine in the presence of ammonium chloride or reaction of ethanolamine hydrochloride with diethanolamine. Other work has shown the use of N-hydroxyethyl derivatives of piperazine using silica-alumina catalysts. In all of these procedures, with the exception of the method set forth in the above-identified co-pending application, the yields have been small.

Of the various reported methods, the ones showing the greatest degree of promise have generally been those in which the cyclic amines are prepared in the presence of an acidic catalyst at elevated temperatures. In our investigation along the lines of improved methods for the preparation of triethylene diamine, a wide variety of charge stocks was tested. It was found that only moderate yields of triethylene diamine were obtained from ethylene diamine; and further, that little more than trace amounts of triethylene diamine were obtained from diethanolamine charge.

It has now been discovered that surprising and unexpected results of a synergistic nature are obtained when these two materials, namely diethanolamine and ethylene diamine, are used as a mixed charge in an acid catalyzed reaction.

These yields are in excess of any given additive effect. The reason therefore is not understood, but is of significant value in that relatively high yields of triethylene diamine can now be obtained from low cost raw materials each of which in itself would be economically unsuited for the production of triethylene diamine. In accordance with this invention, commercially attractive yields of triethylene diamine are obtained by acid catalyzed conversion, at temperatures in the range of 575–900° F., of a charge mixture of 50–75 mol percent diethanolamine and 50–25 mol percent ethylene diamine. Piperazine and other valuable by-products produced are readily separated and can be recovered therefrom.

The preferred catalyst is silica-alumina, particularly of the type familiarly used in catalytic cracking of hydrocarbons, in the form of granules, molded pellets, or beads. Such catalysts include the synthetic dried gel-type catalyst formed by suitable impregnation of silica gel, or by co-precipitation of the silicon and aluminum components, to provide a gel comprising 60–90% by weight $SiO_2$ to 40–10% by weight $Al_2O_3$ and which may include therein other refractory metal oxides such as magnesia or zirconia. Other known silica-alumina catalysts that may be employed include acid-activated clays of the montmorillonite and kaolin types. Catalysts containing a minor quantity of a dehydrogenation metal component, such as 0.5 to 3% nickel supported on the silica-alumina carrier, may also be used.

The desired triethylene diamine product is formed over a reaction temperature range of from about 575 to 900° F.; temperatures in the range of from about 600 to 750° F. are preferred. Within this preferred temperature range, space rates (volume of charge measured as liquid per volume of catalyst per hour) of the order of about 0.5 to 2.0 are likewise preferred. Smaller or greater space rates can be employed but with somewhat less effective results for the desired reaction.

The use of elevated pressure is not essential to the operation. In general, pressures from atmospheric to 100 pounds per square inch gauge may be used. In some instances, particularly when operating at super-atmospheric pressure, it may be desirable to reduce the partial pressure of the amines in the reaction zone, which may be accomplished by the addition of gaseous diluent, such as hydrogen or inert gas in quantities of up to ten mols per mol of the mixed amines charged. Sub-atmospheric pressure operation, either with undiluted charge or with diluted charge wherein the charge partial pressure would be less than atmospheric, appears to have no particular beneficial effect nor any particularly detrimental effect at pressures as low as half an atmosphere.

As shown in the previously identified co-pending application, moderate yields of triethylene diamine are obtained from diethylene triamine in the acid catalyzed reaction. Ethylene diamine alone under similar reaction conditions obtains considerably poorer yields of triethylene diamine and is considerably less selective. When diethanolamine is the charge stock under similar circumstances, the production of both triethylene diamine and piperazine is of such low order as to be of no practical interest. However, when these two materials are admixed in approximately equimolar amounts and then charged to acid catalyzed reactions at elevated temperatures, surprisingly improved yields of triethylene diamine are obtained substantially in the same order as that had with considerably more expensive diethylene triamine charge, as will be seen by reference to the following table.

TABLE

Triethylene diamine synthesis

| Run | 1 | 2 | | 3 | 4 |
|---|---|---|---|---|---|
| Charge | DEA[1] | EDA[2] | Calculated DEA-EDA | Actual DEA-EDA | Actual DEA-EDA |
| SV | 1.1 | 1.2 | 1.1 | 1.0 | 1.1 |
| Temp | ~700° F | 700° F | 700° F | 700° F | 625° F |
| Pressure | Atmos | Atmos | Atmos | Atmos | Atmos |
| Yields Wt. Percent Chg.: | | | | | |
| Triethylene Diamine | 1.8 | 5.3 | 2.9 | 10.0 | 12.8 |
| Piperazine | 0.6 | 4.9 | 2.0 | 2.8 | 4.3 |

[1] DEA = diethanolamine.
[2] EDA = ethylene diamine.

From the above table it is clearly evident that the actual results from runs 3 and 4 using substantially equimolar quantities of diethanolamine and ethylene diamine as the charge are far superior to the calculated values based on the results of runs 1 and 2.

The examples above are indicative of the operation of the invention. It is to be understood modifications may be used such as, for example, recycle operation in which selected portions of the product effluent after removal of the desired triethylene diamine and piperazine are recycled to the reaction zone along with the fresh mixed charge.

A distinct advantage is shown for the diethanolamine-ethylene diamine mixture over either ethylene diamine or diethanolamine when used alone. One advantage in the use of the mixture appears from the value of the product when compared to the cost of raw material. For relative quantities of triethylene diamine when produced from the mixture of diethanolamine and ethylene diamine as compared to the charge stock consisting of diethylene triamine, product value is about four times as great based on the charge. Since it appears that there is a distinct synergistic effect in the production of triethylene diamine using the mixed charge of diethanolamine and ethylene diamine, the product yield per unit cost is distinctly and advantageously higher.

Obviously many modifications and variations of the invention as hereinbefore set forth may be made without departing from the spirit and scope thereof, and therefore only such limitations should be imposed as are indicated in the appended claims.

What is claimed is:

1. The method of preparing 1,4-diazabicyclo-(2.2.2)-octane comprising, contacting a charge mixture of 50 to 75 mol percent diethanolamine and 50 to 25 mol percent of ethylene diamine with an acidic siliceous cracking catalyst at a temperature in the range of 575 to 900° F.

2. The method of preparing 1,4-diazabicyclo-(2.2.2)-octane comprising, contacting a charge mixture of 50 to 75 mol percent diethanolamine and 50 to 25 mol percent of ethylene diamine with an acidic siliceous cracking catalyst at a temperature in the range of 600 to 750° F., at a space rate in the range of 0.5 to 2.0, and at a pressure in the range of 0.5 atmosphere to 100 pounds per square inch gauge.

3. The method in accordance with claim 2 wherein said catalyst comprises 60 to 90% by weight $SiO_2$ and 40 to 10% by weight $Al_2O_3$.

4. The method in accordance with claim 2 wherein said catalyst contains a minor quantity of nickel.

5. The method of preparing 1,4-diazabicyclo-(2.2.2)-octane comprising, contacting a charge comprising approximately equimolar amounts of diethanolamine and ethylene diamine with an acidic silica-alumina cracking catalyst at conditions of a temperature in the range of about 625° to 700° F., a space rate of about 1, and at atmospheric pressure.

References Cited in the file of this patent

Chemische Berichte, vol. 75, pages 1302–1310 (1942).
Ishiguro et al.: Jour. Pharm. Soc. (Japan), vol. 75, pp. 674–677 (1955).